(12) United States Patent
Geck et al.

(10) Patent No.: US 7,567,803 B2
(45) Date of Patent: Jul. 28, 2009

(54) SYSTEM AND METHOD FOR INHIBITING FEATURES FOR WIRELESS TERMINALS

(75) Inventors: Bertram Geck, Boca Raton, FL (US); Francisco Olympio Marcon da Rocha, Boca Raton, FL (US); Robinson Osmar Lima, Boca Raton, FL (US); Luiz Cesar Zaniolo, Boca Raton, FL (US); Enoch Ragin, Jr., Boca Raton, FL (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/967,242

(22) Filed: Sep. 28, 2001

(65) Prior Publication Data
US 2003/0073427 A1 Apr. 17, 2003

(51) Int. Cl.
*H04Q 7/20* (2006.01)

(52) U.S. Cl. ............... 455/434; 455/404.1; 455/411; 455/415

(58) Field of Classification Search ......... 455/415, 455/419, 417, 565, 433, 410, 411, 463, 414, 455/418, 403, 414.1, 414.2, 422.1, 434, 450, 455/456.3, 445, 567, 412.2, 404.1, 404.2, 455/412.1, 423, 456.1, 456.2, 456.6, 435.3, 455/435.2, 435.1, 420, 452.1, 517, 515, 528, 455/67.11, 68, 516
See application file for complete search history.

(56) References Cited

U.S. PATENT DOCUMENTS

| | | | |
|---|---|---|---|
| 5,603,054 A | 2/1997 | Theimer et al. | 395/826 |
| 5,608,723 A | 3/1997 | Felsenstein | 370/335 |
| 5,634,193 A | 5/1997 | Ghisler | 455/33.2 |
| 5,666,662 A | 9/1997 | Shibuya | 455/456 |
| 5,742,668 A * | 4/1998 | Pepe et al. | 455/415 |
| 5,778,304 A * | 7/1998 | Grube et al. | 455/456.4 |
| 5,940,775 A | 8/1999 | Kim | 455/567 |
| 5,946,623 A * | 8/1999 | Spradlin | 455/445 |
| 6,091,959 A | 7/2000 | Souissi et al. | 455/456 |
| 6,097,953 A * | 8/2000 | Bonta et al. | 455/436 |

(Continued)

FOREIGN PATENT DOCUMENTS

CA 2246518 4/1999

(Continued)

OTHER PUBLICATIONS

JP Office Action in JP Appln. 2003-533638, which is the JP counterpart of the present application, citing the above references.

*Primary Examiner*—John J Lee

(57) ABSTRACT

A system and method is presented for the restricting features in a wireless network. A database contains representations of rules that restrict the features of terminals connected to a base station. For an incoming communication, a determination is made as to which terminal is associated with the call, and a database is accessed to look up rules governing restrictions on the terminal and/or the base station connected to the terminal; the terminal is then activated depending on the restrictions. For outgoing communication, when a signal associated with a request for an outgoing communication is received from a terminal, a database is accessed to look up rules governing restrictions; the terminal is connected for outgoing communication depending on whether the restrictions allow it.

26 Claims, 3 Drawing Sheets

U.S. PATENT DOCUMENTS

| | | |
|---|---|---|
| 6,108,563 A | 8/2000 | Shishino |
| 6,201,801 B1 * | 3/2001 | Dent .......................... 370/342 |
| 6,215,994 B1 * | 4/2001 | Schmidt et al. ............. 455/419 |
| 6,230,017 B1 * | 5/2001 | Andersson et al. ....... 455/456.6 |
| 6,256,515 B1 * | 7/2001 | Cox et al. .................... 455/565 |
| 6,295,447 B1 * | 9/2001 | Reichelt et al. ............. 455/417 |
| 6,389,288 B1 * | 5/2002 | Kuwahara et al. ........ 455/456.6 |
| 6,408,187 B1 * | 6/2002 | Merriam ..................... 455/458 |
| 6,449,479 B1 * | 9/2002 | Sanchez ...................... 455/433 |
| 6,643,517 B1 * | 11/2003 | Steer ........................ 455/456.4 |
| 6,757,530 B2 * | 6/2004 | Rouse et al. .............. 455/412.1 |
| 6,832,093 B1 * | 12/2004 | Ranta ...................... 455/456.4 |
| 6,889,040 B1 * | 5/2005 | Koo et al. .................... 455/418 |
| 6,947,405 B2 * | 9/2005 | Pitcher et al. ............... 370/338 |
| 2002/0003793 A1 * | 1/2002 | Poppe et al. ................. 370/352 |
| 2004/0121769 A1 * | 6/2004 | Aoki et al. ................ 455/435.1 |

FOREIGN PATENT DOCUMENTS

| | | |
|---|---|---|
| EP | 0998159 A1 * | 3/2000 |
| EP | 0 998 159 A1 | 5/2000 |
| GB | 2 344 971 | 6/2000 |
| GB | 2354407 A * | 3/2001 |
| JP | 09-322261 | 12/1997 |
| JP | 11-018154 | 1/1999 |
| JP | 11018154 | 1/1999 |
| JP | 2000-184444 | 6/2000 |
| JP | 2001-78260 | 3/2001 |
| JP | 2001-078260 | 3/2001 |
| WO | WO 97/49255 | 12/1997 |

* cited by examiner

SYSTEM AND METHOD FOR INHIBITING FEATURES FOR WIRELESS TERMINALS

BACKGROUND OF THE INVENTION

1. Field of the Invention

The present invention relates to wireless services. More particularly, the present invention relates to determining and implementing rules for one or more base stations of a wireless service.

2. Description of Related Art

In a wireless network, terminals, such as telephones, are generally connected wirelessly to a given base station at any given moment. In a typical system, an idle terminal receives signals from one or more base stations in the vicinity. If there is more than one signal present, the terminal analyzes the signals and connects itself to the base station associated with the strongest signal. If there is an incoming communication being directed to a specific terminal, a signal is sent from the connected base station to activate the terminal. The type of activation is often defined by the user; for example, the user may program a terminal to ring at a particular volume, or to vibrate instead.

Known wireless systems may offer additional options to users, such as the ability to program voice mail and e-mail features, with or without a temporal limit. For example, a user may choose to direct all voice calls directly to voice mail, whether the terminal is in range of a base station or not. A user may desire to forward calls, either without ringing the terminal or after a predetermined number of rings, to another phone number. Additionally, a user may wish to allow only e-mails and/or SMS messages to activate the terminal, so that during a meeting the user is not disturbed by callers. On the other hand, a user may wish to forward e-mails, especially those over a given size, to another e-mail account. Of course, some wireless systems provide combinations of these options and more.

In the known wireless systems, it is usually up to the user to define the rules governing the reaction of the terminal to an incoming call or message. Although a network administrator may have control over some rules, such as whether incoming calls activate terminals, such control is often limited. For example, the network administrator might only be able to control the reaction of terminals to all incoming calls, but not be able to distinguish between calls emanating from a particular location or exchange and other calls. Even if an administrator's actions can define the parameters of terminal activation when the terminal is within a geographical location, the administrator might not have any control over outgoing calls.

Some known systems can determine the location of terminals with varying degrees of precision and accuracy, for example the systems disclosed by U.S. Pat. No. 5,608,723 to Felsenstein for "Methods and Systems for Secure Wireless Communication Within a Predetermined Boundary", U.S. Pat. No. 5,666,662 to Shibuya for a "Method for Detecting the Location of a Mobile Terminal", U.S. Pat. No. 5,778,304 to Grube et al. for a "Method for Providing Communication Services Based on Geographical Location", and U.S. Pat. No. 6,091,959 to Souissi et al. for a "Method and Apparatus in a Two-Way Wireless Communication System For Location-Based Message Transmission". Many systems that determine the location of terminals are costly to implement, though the ability to determine whether or not a terminal is inside a pre-defined and pre-determined area of space at a given time may help in setting the rules governing that terminal.

SUMMARY OF THE INVENTION

It is therefore an object of the invention to provide a system and method for implementing special rules for a base station of a wireless service.

It is another object of the invention to provide a system and method for defining rules for a terminal situated within a particular area.

It is yet another object of the invention to provide a system and method for reducing disturbances in an environment due to ringing terminals.

It is yet another object of the invention to provide a system and method providing an environment in which the use of terminals for making outgoing calls is limited.

The invention determines special rules for a base station of a wireless service. For example, a base station that is inside a meeting room can be governed by rules that restrict terminals wirelessly connected to it from ringing.

The administrator of the wireless network can program a database in the system with the rules. When communications, such as calls or text messages, are directed to a terminal, the system accesses the database. Based on information in the database, the system will take a predefined action, for example ring the terminal or forward a caller to voice mail.

The administrator may have control over the rights of each terminal based on its location. A database may be programmed with restrictions on base stations and/or specific terminals.

DETAILED DESCRIPTION

A wireless system utilizes rules to determine a course of action related to communication with a wireless terminal within a wireless network or portion thereof.

Figure 1:
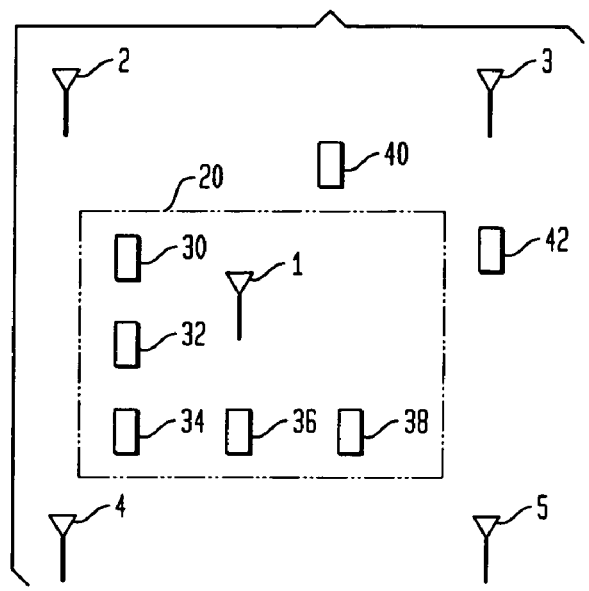
FIG. 1 is an example of a base station in a room with several terminals.

With reference to FIG. 1, base station 1 in room 20 is shown. Terminals 30, 32, 34, 36, 38, such as wireless telephones carried by users in a preferred embodiment, are present inside room 20. Terminals 40, 42 are present outside of room 20.

In a preferred embodiment, a network administrator has access to a database (not shown) that contains representations of rules for base stations, including base stations 1-5, and representations of rules for terminals 30-42. The network administrator may alter the database in order to modify the rules. For example, before the rules are defined, there are no restrictions. All the terminals are free to make calls and to receive calls, and to ring at any volume upon receiving a call. Once the rules are modified, restrictions may be put in place to define what is allowed.

For example, in a preferred embodiment, the database has rules restricting only base station 1, which governs room 20, and the reception of calls by terminals 30-42. Table 1 shows an example of some simple rules.

TABLE 1

| Base Station or Terminal | Rule |
| --- | --- |
| Base Station 1 | Only priority 1 terminals may ring in room; priority 3 terminals may not receive calls |
| Terminal 30 | Priority 3 |
| Terminal 32 | Priority 3 |
| Terminal 34 | Priority 1 |
| Terminal 36 | Priority 3 |
| Terminal 38 | Priority 2 |
| Terminal 40 | Priority 1 |
| Terminal 42 | Priority 3 |

Based on the rules shown in Table 1, of the terminals inside room 20, only terminals 34 and 38 may be activated by base station 1 to receive calls. If a call is made to terminal 34, terminal 34 will ring or vibrate, according to the user setting. If a call is made to terminal 38, terminal 38 may only vibrate, but not ring. Based on the rules shown in Table 1, if a call is made to terminal 40, terminal 40 is activated as long as it is in range of one of the base stations.

Based on the rules shown in Table 1, terminal 42 may or may not be activated based on which preferred embodiment is implemented. In a preferred embodiment, in order to save costs the system is not designed to determine whether terminal 42 is inside room 20, and if terminal 42 is close enough to base station 1 it will be treated as if it were inside room 20, and not be activated. Thus, even if the rules do not depend on the location of terminal 42, the activation of terminal 42 does depend on whether it is wirelessly connected to base station 1.

In an alternative preferred embodiment, shielding exists substantially around the perimeter of room 20 to prevent a connection between terminal 42 and base station 1, so that the rules of base station 1 do not apply to terminal 42.

In yet another preferred embodiment, the system is more sophisticated and detects the location of terminal 42 relative to room 20, and determines that since it is outside room 20 the restrictions of base station 1 do not apply.

Table 2 shows an example of a database containing rules for base stations but none for terminals.

TABLE 2

| Base Station | Rule |
| --- | --- |
| Base Station 1 | terminals may not ring, but may vibrate |
| Base Station 2 | terminals may not ring/vibrate (text messages only) |
| Base Station 3 | no external outgoing calls allowed |
| Base Station 4 | no incoming calls allowed between 9 pm and 6 am |
| Base Station 5 | no restrictions |

Based on the rules shown in Table 2, base stations 1-5 are given different rules. For example, terminals connected to base station 1 may vibrate but not ring. Such a restriction is desirable, for example, where it is important that a meeting not be disturbed by ringing phones, yet it is also important that the participants of the meeting remain reachable through their terminals.

Terminals connected to base station 2 may not vibrate or ring. This restriction may be desirable when it is important that participants in a meeting are not distracted by ringing or vibrating terminals, but it is also important that the participants can check text messages.

Those terminals that are connected to base station 3 may receive calls, but may not make external outgoing calls. This restriction may be desirable to prevent employees at a particular location from making personal calls.

Terminals connected to base station 4 may receive incoming calls only during certain hours. This restriction may be desirable in a home office, for example, to ensure that terminals connected to base station 4 are not activated when individuals are likely to be asleep.

Finally, terminals connected to base station 5 are not restricted in any way.

Figure 2:
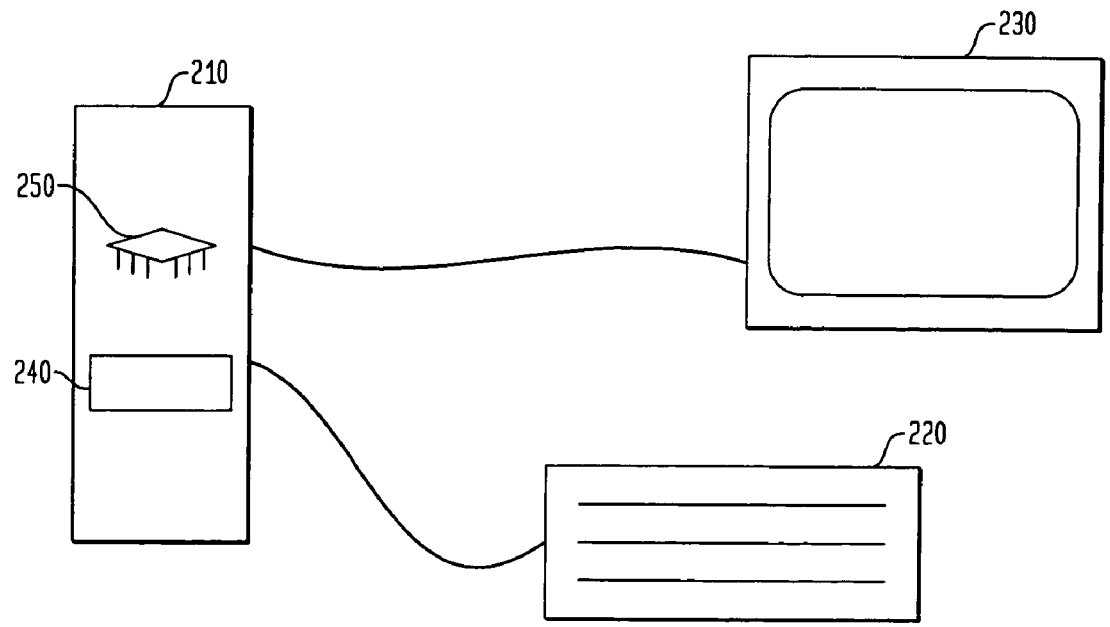
FIG. 2 is a diagram of a computer system on which a database may reside and be modified.

With reference to FIG. 2, a diagram of a computer system on which the invention may be implemented is shown. Computer 210 is attached to input device 220, which may be, for example, a keyboard and/or mouse. Computer 210 is also attached to an output device 230, which may be, for example, a monitor. In a preferred embodiment, a database (not shown) resides on computer-readable media 240 (such as a hard drive). Software that is used to modify the database may also reside on media 240, or may reside on separate media, and contains instructions that are executed by CPU 250.

Figure 3:
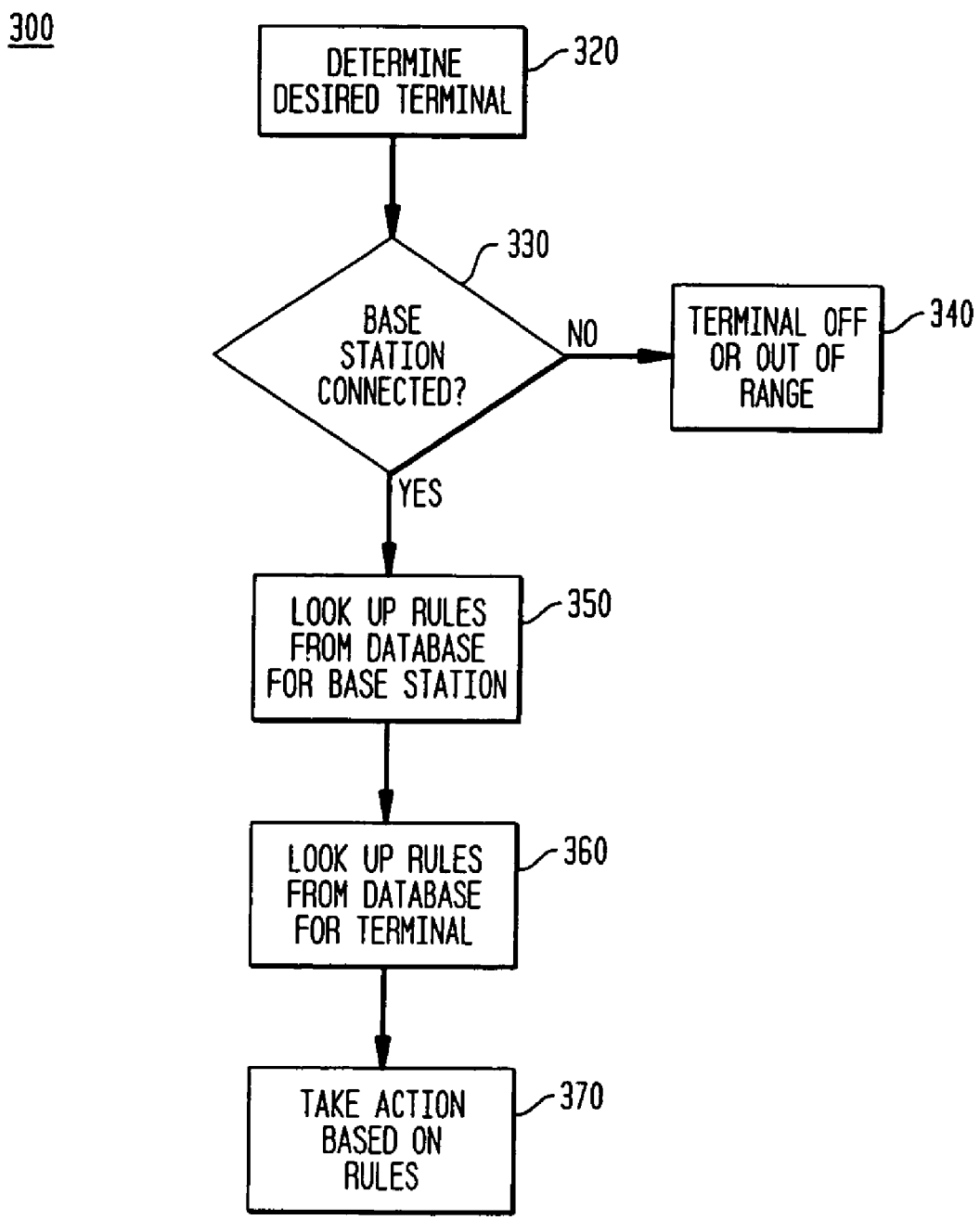
FIG. 3 is a flow chart showing a preferred embodiment for a process of determining what rules and/or restrictions to apply when there is an incoming call.

With reference to FIG. 3, a preferred embodiment for processing incoming communications 300 is shown. When an incoming communication is received, a determination 320 is made as to which terminal is desired. A determination 330 is made as to whether there is a base station connected to the terminal. If no base station is connected, the system proceeds as if the terminal is off or out of range 340. If a base station is connected, rules from the database for the applicable base station are accessed 350, and rules from the database for the applicable terminal are accessed 360. Based on the retrieved rules, the system takes an action 370. The action 370 may be, by way of example, causing the desired terminal to ring, causing the desired terminal to vibrate, or directing the communication to a messaging system.

Alternative preferred embodiments exist for handling incoming communications. For example, accessing 350 base station rules and accessing 360 terminal rules may occur in a different order or even simultaneously, or accessing 360 terminal rules may be skipped if terminal rules do not exist. In a preferred embodiment an emergency incoming communication can override any restrictions that are in place.

Figure 4:
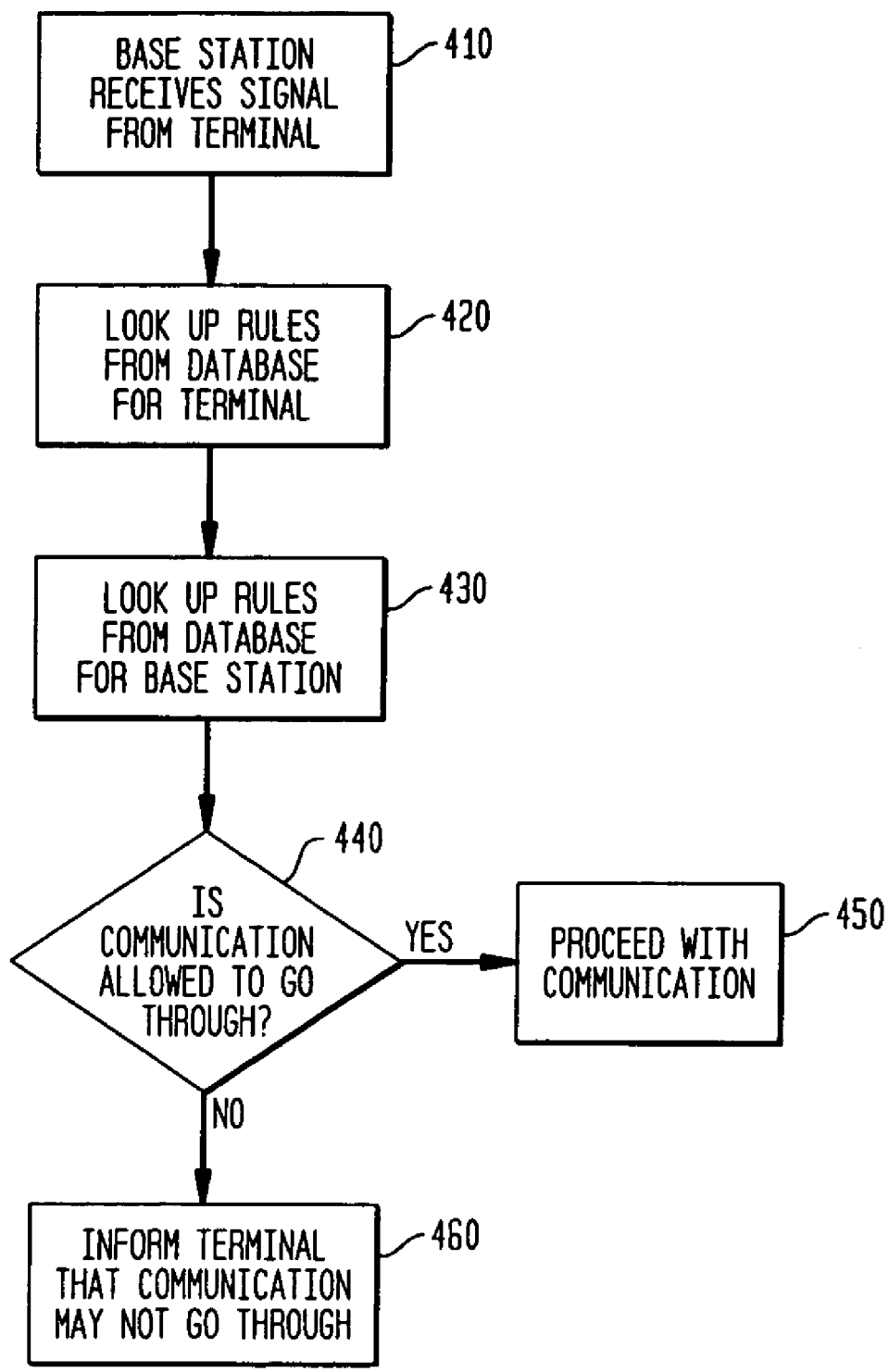
FIG. 4 is a flow chart showing a preferred embodiment for a process of determining what rules and/or restrictions to apply when there is an outgoing call.

With reference to FIG. 4, a preferred embodiment for processing outgoing communications 400 is shown. A base station receives 410 a signal associated with a request to make an outgoing communication from a connected terminal. Rules from the database for the applicable terminal are accessed 420 and rules from the database for the applicable base station are accessed 430. A determination 440 is made as to whether the communication is allowed to go through. If the communication is allowed to go through, the system proceeds 450 with the activation of the terminal and communication (in a preferred embodiment, there may be, depending on the rules, a restriction such as only vibration but no ringing allowed upon activation, for example). If the communication is not allowed to go through, the terminal is informed 460 that the communication may not go through.

Alternative preferred embodiments exist for processing outgoing communications. For example, accessing 420 terminal rules and accessing 430 base station rules may occur in a different order or even simultaneously, or accessing 420 terminal rules may be skipped if terminal rules do not exist. In a preferred embodiment an emergency outgoing communication can override any restrictions that are in place.

The above preferred embodiments can be implemented in various wireless networks, such as voice, video, data, encrypted information, and so on. Actions may be taken based on rules related to specific terminals, specific base station, or the type of desired communication (such as whether there is an emergency, whether the desired communication is external, etc.), or the format of desired communication (whether the desired communication is voice, data, video, etc.), or a combination thereof. In a preferred embodiment, the system as described above is implemented in the HiPath™ wireless system provided by Siemens Corp.

While the invention has been described in terms of preferred embodiments, those skilled in the art will recognize that the invention can be practiced with modification within the spirit and scope of the appended claims.

We claim:

1. A system for restricting features in a wireless network, comprising:
    at least one base station;
    at least one wireless terminal wirelessly connectable to one or more base stations and wirelessly connected to said at least one base station, each base station operative in communicating an incoming communication directed to, and an outgoing communication originated by, each wirelessly connected wireless terminal; and
    a base station rules database comprising representations of the base station rules restricting features of said each wirelessly connected wireless terminal wirelessly connected to a respective said each base station, wherein any restriction for said each wirelessly connected wireless terminal is dependent on the base station rules corresponding to a respective base station,
    wherein said respective base station applies said base station rules to communications responsive to communications between wirelessly connected wireless terminals and said respective base station and location of each of said wirelessly connected wireless terminals, and
    wherein the base station restricts features depending at least on whether a communication is incoming or outgoing and the base station selectively prevents incoming communications from reaching ones of said wirelessly connected wireless terminals while allowing outgoing communications.

2. The system of claim 1, wherein the base station restricts features depending at least on the time of day.

3. The system of claim 1, wherein the base station restricts features depending at least on the priority of said each of said wirelessly connected wireless terminals.

4. The system of claim 1, wherein the base station restricts features depending at least on whether a communication is designated as an emergency.

5. The system of claim 1, wherein at least one wirelessly connected wireless terminal is a wireless telephone.

6. The system in claim 1, wherein the base station prevents at least one wireless terminal from ringing while wirelessly connected to said respective base station.

7. The system in claim 1, wherein each respective base station determines from said base station rules database whether to apply the rules for each wirelessly connected terminal responsive to wireless connection to said each respective base station, but otherwise are independent of the location of said each wirelessly connected terminal.

8. The system in claim 1, wherein the base station further restricts features responsive to the specific wirelessly connected wireless terminal.

9. The system in claim 1 wherein the restriction on features includes a restriction invoked by said each base station independent of the specific identity of the wirelessly connected wireless terminal.

10. A method for the restriction of features in a wireless network, comprising the steps of:
    determining which one of a plurality of terminals is associated with an incoming communication, and whether the one of a plurality of terminals is connected to a base station that is selectively operative in communicating incoming communications directed to the one of a plurality of terminals;
    accessing, in response to the incoming communication and in event of the one of a plurality of terminals being connected to said base station, at least one database to look up base station rules governing restriction on the base station connected to the one of a plurality of terminals, the look up base station rules governing restriction on the base station being independent of a specific identity of the one of a plurality of terminals;
    accessing at least one database to look up terminal rules governing restriction on an wirelessly connected terminal; and
    activating the one of a plurality of connected terminals if allowed, wherein allowance depends at least on the look up terminal rules governing restriction on the base station in the base station rules, and wherein the allowance is responsive to the database to look up terminal rules governing restriction on the terminal in the terminal rules.

11. The method of claim 10, further comprising the step of accessing the at least one database to look up the base station rules governing restriction on the one of a plurality of terminals, and wherein the allowance depends at least on the restriction on the one of a plurality of terminals.

12. The method of claim 10, wherein the allowance does not depend on the location of the at least one terminal.

13. The method of claim 10, wherein the allowance depends at least on whether the communication is designated as an emergency.

14. The method of claim 10, wherein the restriction on the base station is time-dependent.

15. The method of claim 10, wherein the allowance depends at least on the format of communication.

16. The system of claim 10, wherein the one of a plurality of terminals is a wireless telephone in a private wireless network.

17. The system in claim 10, wherein the restriction on the base station is that the base station may not cause the one of a plurality of terminals to ring.

18. A system for restricting features in a wireless network, comprising:
    a plurality of base stations;
    at least one wireless terminal wirelessly connectable to said plurality of base stations and wirelessly connected to one of said plurality of base stations;
    a base station rules database with representations of rules for restriction on at least two base stations, the rules of restriction indicating whether or not each base station subjects a communication received by the base station rules database to a restriction that is independent of a specific identity of a communication originating device and independent of the specific identity of a communication destination device, wherein at least one of the communication originating device and the communication destination device is said at least one wireless terminal within a coverage area of said one; and
    wherein said base station rules database is accessed responsive to communications between wirelessly connected wireless terminals and respective ones of said plurality of base stations and location of each of said wirelessly connected wireless terminals, and
    wherein the respective ones of the plurality of base stations restrict features depending at least on whether a communication is incoming or outgoing and the respective ones selectively prevent incoming communications from reaching ones of said wirelessly connected wireless terminals while allowing outgoing communications.

19. A system for restricting features in a wireless network, comprising:
   at least one base station;
   at least one wireless terminal wirelessly connectable to and wirelessly connected to said at least one base station, each base station operative in communicating an incoming communication directed to, and an outgoing communication originated by, each wirelessly connected wireless terminal located within a given range of said each base station; and
   a base station rules database comprising representations of the base station rules for individually restricting features provided by each said at least one base station to each connected said at least one wireless terminal wirelessly, wherein restriction on features depends at least on whether a communication is designated as an emergency and independent of any information about said each at least one wireless terminal, and wherein said base station rules database is accessed responsive to communications between wirelessly connected wireless terminals and respective base stations and location of each of said wirelessly connected wireless terminals within a given range of a respective base station, and
   wherein the respective base stations restrict features depending at least on whether a communication is incoming or outgoing and selectively prevent incoming communications from reaching ones of said wirelessly connected wireless terminals while allowing outgoing communications.

20. A method for the restriction of features in a wireless network, comprising the steps of:
   determining which one of a plurality of wireless terminals is associated with an incoming communication, and whether the one of a plurality of terminals is wirelessly connected to a base station that is selectively operative in communicating incoming communications directed to the one of a plurality of wireless terminals;
   accessing, in response to incoming emergency communication to the one of a plurality of wireless terminals wirelessly connected to said base station, at least one database to look up base station rules governing restriction on the base station wirelessly connected to the one of a plurality of wireless terminals;
   accessing at least one database to look up terminal rules governing restriction on the wirelessly connected terminal; and
   selectively activating the one of a plurality of wireless terminals responsive to the emergency communication being designated an emergency, and further responsive to restriction on the terminal in the terminal rules.

21. A method for the restriction of features in a wireless network, comprising the steps of:
   accessing at least one database to look up base station rules governing restriction on a base station in response to the base station receiving a signal from a wirelessly connected terminal associated with a request for an outgoing emergency communication by the wirelessly connected terminal;
   accessing at least one database to look up terminal rules governing restriction on the wirelessly connected terminal; and
   selectively connecting the wirelessly connected terminal for the outgoing emergency communication responsive to the emergency communication being designated as an emergency, and further responsive to restriction on the terminal in the terminal rules.

22. The method of claim 21, wherein allowance is provided for communications not designated emergency further responsive to restrictions including whether the wirelessly connected terminal is inside a predetermined room.

23. The method of claim 21, wherein the restriction on the base station is time-dependent.

24. The method of claim 21, wherein allowance is provided for communications not designated emergency further responsive to restrictions including the format of communication.

25. The system of claim 21, wherein the wirelessly connected terminal is a wireless telephone in a private wireless network.

26. The method of claim 21, wherein allowance is provided for communications not designated emergency further responsive to restrictions independent of the location of the wirelessly connected terminal.

* * * * *